(12) United States Patent
Meehan

(10) Patent No.: US 6,889,351 B1
(45) Date of Patent: May 3, 2005

(54) BACKWARD COMPATIBLE MULTIPLE DATA STREAM TRANSMISSION METHOD AND SYSTEM FOR COMPRESSED DOMAIN SIGNALS

(75) Inventor: Joseph P. Meehan, White Plains, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/539,909

(22) Filed: Mar. 30, 2000

(51) Int. Cl.⁷ .................. G06F 11/00; H03M 13/00
(52) U.S. Cl. ........................... 714/752; 714/746
(58) Field of Search ................. 714/755, 786, 714/746, 752; 375/262, 341, 240; 386/111

(56) References Cited

U.S. PATENT DOCUMENTS

| | | |
|---|---|---|
| 5,327,237 A | 7/1994 | Gerdes et al. ............... 348/476 |
| 5,387,941 A | 2/1995 | Montgomery et al. ...... 348/473 |
| 5,410,360 A | 4/1995 | Montgomery et al. ...... 348/473 |
| 5,544,328 A * | 8/1996 | Seshadri ..................... 375/261 |
| 5,557,333 A | 9/1996 | Jungo et al. ................ 348/473 |
| 5,559,559 A | 9/1996 | Jungo et al. .............. 348/432.1 |
| 5,561,714 A | 10/1996 | Hershberger ................ 380/216 |
| 5,572,247 A | 11/1996 | Montgomery et al. ...... 725/139 |
| 5,583,889 A * | 12/1996 | Citta et al. .................. 375/341 |
| 5,587,743 A | 12/1996 | Montgomery et al. ...... 348/473 |
| 5,617,148 A | 4/1997 | Montgomery et al. ...... 348/473 |
| 5,666,168 A | 9/1997 | Montgomery et al. ...... 348/473 |
| 5,691,995 A * | 11/1997 | Ikeda et al. ................. 714/786 |
| 5,831,679 A | 11/1998 | Montgomery et al. ...... 348/473 |
| 6,493,409 B1 * | 12/2002 | Lin et al. ..................... 375/375 |

FOREIGN PATENT DOCUMENTS

| | | | |
|---|---|---|---|
| EP | 0719043 A2 | 5/1996 | .......... H04N/7/088 |
| EP | 0914004 A1 | 5/1999 | ............. H04N/7/26 |
| WO | WO9750247 | 12/1997 | .......... H04N/7/025 |

* cited by examiner

*Primary Examiner*—Shelly A Chase

(57) ABSTRACT

A method and system for generating a compressed domain, digital signal suitable for transmission, the method including: providing a first digital data stream signal including a first plurality of data bits and a second digital data stream signal including a second plurality of data bits; determining a threshold value for the first digital data stream signal; identifying select ones of the first plurality of bits dependent upon the threshold value; and, substituting data bits from the second plurality for the select bits of the first plurality to generate a composite digital data stream signal; wherein the composite digital data stream signal is adapted to be received and decoded by receivers adapted to receive the first digital data stream signal and receivers adapted to receive the composite digital data stream signal.

29 Claims, 2 Drawing Sheets

BACKWARD COMPATIBLE MULTIPLE DATA STREAM TRANSMISSION METHOD AND SYSTEM FOR COMPRESSED DOMAIN SIGNALS

FIELD OF INVENTION

The present invention relates to compressed domain transmission and reception methods and systems, and more particularly to an improved method for combining a second compressed digital data stream signal with a first compressed digital data stream signal without degrading transmission/reception performance of the system for the first compressed digital signal data stream signal.

BACKGROUND OF INVENTION

The Advanced Television Systems Committee Digital Television standard (ATSC DTV) describes a system design standard for providing high-quality audio, video and ancillary data transmission and reception using a single 6 MHz channel. An ATSC DTV compliant system can reliably deliver approximately 19 Mbits/sec over a 6 Mhz terrestrial (8 VSB) broadcasting channel and approximately 38 Mbits/sec over a 6 Mhz cable television (16 VSB) channel.

Predictably, as the popularity of DTV systems grows, so does the demand for more efficient overall use of the allocated bandwidth and increased reliability. Accordingly, there is a need to more efficiently utilize the overall allocated bandwidth of an ATSC DTV signal in an ATSC system.

SUMMARY OF INVENTION

A method and system for generating a compressed domain, digital signal suitable for transmission, the method including: providing a first digital data stream signal including a first plurality of data bits and a second digital data stream signal including a second plurality of data bits; determining a threshold value for the first digital data stream signal; identifying select ones of the first plurality of bits dependent upon the threshold value; and, substituting data bits from the second plurality for the select bits of the first plurality to generate a composite digital data stream signal; wherein the composite digital data stream signal is adapted to be received and decoded by receivers adapted to receive the first digital data stream signal and receivers adapted to receive the composite digital data stream signal.

DETAILED DESCRIPTION OF THE INVENTION

The present invention will be described as it relates to an 8VSB terrestrial broadcast mode ATSC DTV system. However, it should be understood the present invention is equally applicable to other types of compressed domain signal transmission/reception systems as well though.

Figure 1:
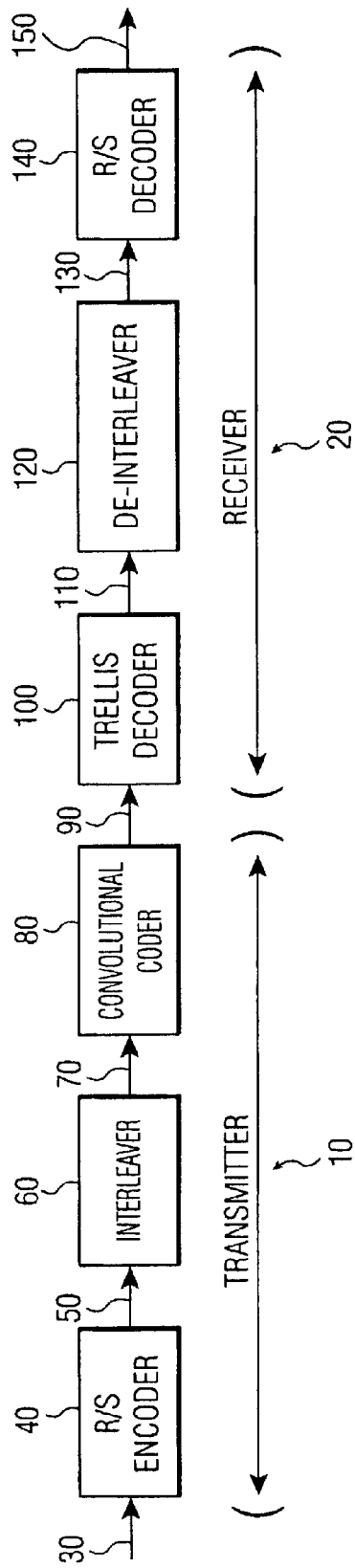
FIG. 1 is a block diagram illustrating some basic components of a conventional ATSC transmitter and receiver pair.

Referring now to the Figures, like numerals identify like elements of the invention. FIG. 1 is a partial block diagram of the basic components of a conventional ATSC transmitter 10 and receiver 20 pair used for transmitting and receiving a single digital data stream signal 90. Input data stream signal 30 which including MPEG compatible 188 byte packets to be transmitted are processed to provide Forward Error Correction (FEC) using a Reed-Solomon (R/S) encoder 40, an interleaver 60 and a convolutional coder 80. More particularly, the signal 30 is fed to the R/S encoder 40 to provide signal 50 which includes 20 parity bytes for each 188 byte packet. The signal 50 is then fed into the interleaver 60 which outputs an interleaved signal 70 having the characteristics of $\frac{1}{12}$ interleaving of the bits. The interleaved signal 70 is then fed to the convolutional coder 80 which provides $\frac{2}{3}$ rate trellis coding for the signal 70, to generate the coded signal 90 as is conventionally understood. The coded signal 90 is formatted into data frames and synchronization information is added using conventional processes and elements (not shown). The formatted signal 90 is then transmitted for reception by receiver 20, using in this embodiment the 8 VSB terrestrial broadcast mode, this process being well understood by those possessing ordinary skill in the art as it relates to the discussed ATSC DTV standard. The received signal 90 is processed by the trellis decoder 100, the deinterleaver 120 and R/S decoder 140 to provide decoded signal 150 as is also conventionally understood.

Generally, the method of the present invention combines a second data stream with an ATSC data stream signal 90, and then modulates and transmits the combined data stream. The second data stream has a bit rate lower than that of the ATSC data stream. According to a preferred embodiment of the invention, the second data stream can be up to a 2.152 Mbps data stream and can be combined with the ATSC data stream using 2VSB processing techniques without degrading the performance of the ATSC DTV system. Further, the second data stream can be used as a continuous training sequence or as a second, low bit rate content provider data stream such as is commonly used in data-casting stock information.

In order to ensure that the present system is backward compatible, it is important that when the second stream is combined with the first stream (the conventional ATSC stream), that the error rate of the first stream remains sufficiently low to satisfy appropriate requirements. In the case of an ATSC stream, an appropriate requirement being Threshold Of Visibility (TOV) for example. The Threshold of Visibility (TOV) for an ATSC signal has been established by subjective viewing measurements to be a segment error probability of $1.93 \times 10^{-4}$ at the R/S decoder 140 output. Hence, a receiver according to the present invention should be capable of decoding both the first and second streams, while a conventional receiver continues to be able to decode the first stream without the second stream interfering with overall system performance.

Assuming the first data stream (data stream 1) is a conventional ATSC stream for sake of explanation, it has a 19.28 Mbps data rate. Assuming also that the transmission channel is ideal, it has been discovered that at certain times, certain ones of the of the symbols to be transmitted from data stream 1 can be replaced with symbols from data stream 2 (the additional data stream) thereby forming a combined data stream.

In a first embodiment, bits from the data stream are replaced with bits from data stream 2 before R/S encoding (e.g. prior to processing by R/S encoder 40). In such a case, to satisfy the TOV requirements for the ATSC signal, the segment error rate at the output of the R/S decoder 140 (of the signal 150) and hence at the R/S decoder 140 input (of signal 130) has been experimentally determined to be approximately $1.93 \times 10^{-4}$. Assuming that the R/S decoder 140 can decode 10 symbol errors per segment, the TOV is equivalent to a maximum SER at the RS decoder output of $$\max SER = \left[\left(\left(\frac{1}{Seg.ER} - 1\right) \times 10\right) + (1 \times 11)\right] \Big/ \frac{1}{Seg.ER} \times \text{Length of Segment}$$

where it is assumed that the R/S decoder 140 can decode 10 symbol errors per segment and the Length of a segment is 828 data symbols. The maximum SER is 0.012. This means that 1 in 83 symbols from Data Stream 1 can be replaced by symbols from Data Stream 2 at the R/S encoder 40 input while keeping Data Stream 1 above the TOV for all ATSC receivers. Thus, the maximum data rate for Data Stream #2 can be defined as R2=max SER×19.28 Mbps where 19.28 Mbps is the payload data rate before coding, resulting in a 0.23 Mbps 8-VSB signal as Data Stream 2. This results in data stream 2 essentially being transmitted as a 0.23 Mbps 8VSB signal within the ATSC DTV signal 1.

According to a preferred embodiment of the present invention, first and second data streams are conventionally provided. Bits from the first data stream (an ATSC data stream) are replaced with bits from a second data stream after convolutional encoding. In such a case, to satisfy the TOV requirements for an ATSC system, the SER at the Trellis decoder 100 input (signal 90), and hence at the output of the convolutional coder 80, has been found to be approximately 0.2. This means 1 of every 5 symbols can be an error, while still satisfying the TOV requirements. Therefore, 1 of every 5 symbols at the output of the convolutional coder 80 (signal 90) can be from the second data stream while still ensuring that conventional ATSC receivers continue to receive the first data stream at a rate which satisfies the TOV requirements. This results in the second data stream advantageously being approximately transmitted as a 6 Mbps 8VSB signal within the ATSC DTV signal (32.28 MHz/5). The invention will be further discussed as it relates to this preferred embodiment.

Figure 2A:
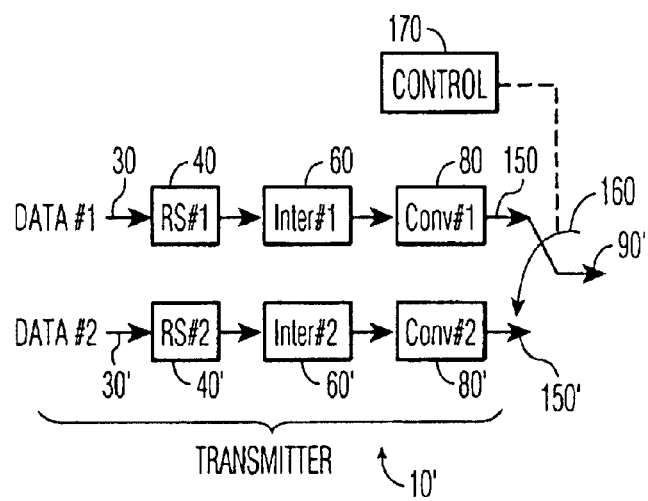
FIG. 2 is a block diagram of a transmitter according to a preferred embodiment of the present invention with a conventional receiver and receiver according to a preferred embodiment of the present invention; and, FIG. 3 illustrates a conventional convolutional encoder.
Figure 2B:
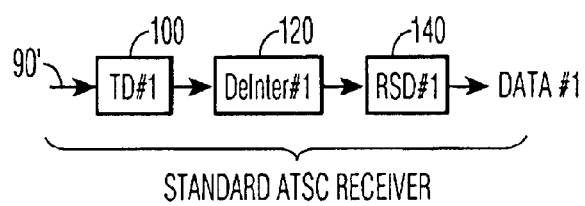
Figure 2C:
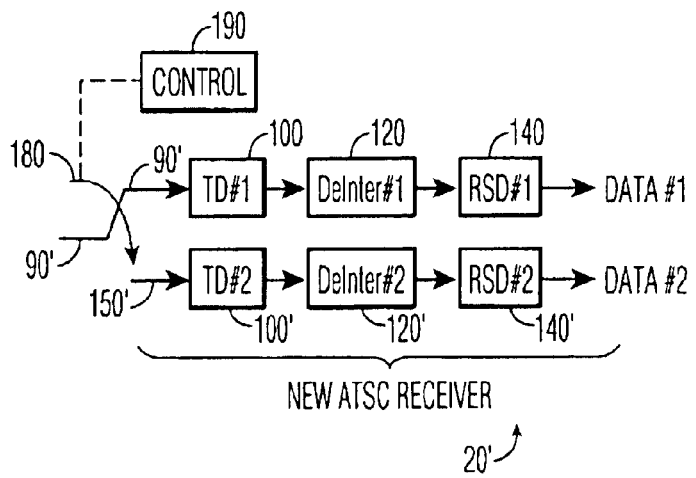

Referring now also to FIG. 2, therein is illustrated a transmitter 10' according to the present invention, a conventional ATSC receiver 20 such as is illustrated in FIG. 1, and an ATSC receiver 20' according to the present invention. The transmitter 10' includes conventional R/S encoder 40, interleaver 60 and convolutional encoder 80 serially coupled to provide FEC for data stream 1 (the standard ATSC stream). The transmitter 10' further includes, according to a preferred form of the invention, a second R/S encoder 40', a second interleaver 60' and a second convolutional encoder 80' serially coupled to provide FEC for data stream 2 (the additional, second data stream to be combined with the ATSC data stream). Therefore, data streams 1 and 2 each are separately coded and interleaved forming signals 150 and 150' independent of one another. Signals 150 and 150' are combined to form a composite data stream by replacing symbols from data stream 1 (signal 150) with symbols from data stream 2 (signal 150') at selected intervals using switch 160 responsively to controller 170.

Again for purposes of explanation, assuming the maximum transmission rate across an ideal channel is 10.76 MHz, this results in stream 2 being transmitted at a rate of 2.152 MHz (10.76/5). It should of course be understood that to adjust for a non-ideal channel, the rate at which symbols from data stream 1 are replaced by symbols from data stream 2 can be changed. For example, if an SER of 0.15 at the input of the trellis decoder 100 (signal 90) results from interference such as channel noise, 1 out of every 20 symbols of data stream 1 (signal 150) can be replaced with a symbol from data stream 2 (signal 150') resulting in data stream 2 being transmitted at a rate of 0.538 MHz (10.76/20).

The receiver 20 of FIG. 2 receives, decodes and deinterleaves the received signal 90' conventionally, as the TOV for the ATSC DTV signal 1 has not been violated and the symbols inserted from data stream 2 are merely identified as errors in data stream 1 and corrected for. The receiver 20' includes conventional trellis decoder 100, deinterleaver 120 and R/S decoder 140 for conventionally decoding and deinterleaving data stream 1 which represents the ATSC DTV data stream. The receiver 20' includes trellis decoder 100', deinterleaver 120' and R/S decoder 140' for decoding and deinterleaving data stream 2 (the second data stream combined with the ATSC DTV data stream 1) according to the preferred embodiment.

Transmitter 10' and receiver 20' further preferably respectively include switches 160, 180 and controllers 170, 190. The switches 160, 180 are respectively responsive to the controllers 170, 190 which are synchronized using conventional ATSC DTV methodology. The switch 160 is operable to receive the signals 150, 150', and at predetermined intervals selectively switch there between to effectuate selective replacement of symbols from data stream 1 (signal 150) with symbols from data stream 2 (signal 150'). For example, if 1 of every 5 symbols from data stream 1 (signal 150) is to be replaced with a symbol from data stream 2 (signal 150'), the controller 170 causes the switch 160 to feed signal 150 as output signal 90' for four symbols, and then switch to feed signal 150' for one symbol, and then back to feed signal 150 for four more symbols, and so on. Analogously, the switch 180 of receiver 20' receives the signal 90' and selectively provides it to trellis decoders 100 and 100' responsively to controller 190. Again, assuming the 1 out of 5 example discussed, the first four symbols received are fed to trellis decoder 100, the fifth symbol is fed to both trellis decoders 100 and 100', then four more to trellis decoder 100, and so on. The controllers 170, 190 include counters in a particularly preferred embodiment of the invention for respectively tracking the number of symbols passed, in order for appropriate action of the switches 160, 180 to be effected. This switching can be accomplished using conventional switches, or a software switching algorithm as is well known in the art.

Figure 3:
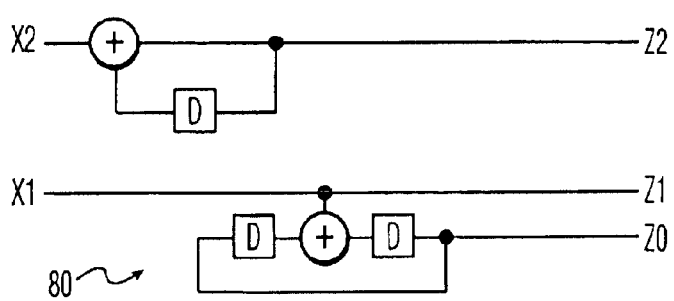

The ATSC 8VSB system uses a ⅔ rate trellis code, where one input bit is encoded into two output bits, the other input bit is precoded, and 12 identical Trellis coders are utilized. Referring now also to FIG. 3, there is illustrated a block diagram of conventional ⅔ rate convolutional encoder suitable for use as convolutional coder 80. The encoder 80 receives 2 bits X1, X2 and provides three output bits Z0, Z1 and Z2, where the delay D is 12 as is well understood. Assuming bits X1 and X2 are provided as part of data stream 1, it has been found that the SER of the method according to the present invention is sensitive to bits Z2 and Z1 being replaced with bits from data stream 2. However, it has also been found that replacing the Z0 bit from data stream 1 signal 150 with the 2VSB (and hence 1 bit) data stream 2 signal 150' did not reduce the SER of data stream 1. Table 1 illustrates simulation results for data stream 1 having an 8VSB data rate of 10.76 MHz and data stream 2 having a 2VSB symbol rate of 2.152 MHz, and the identified bit of each fifth symbol of data stream 1 being replaced by a bit from data stream 2.

TABLE 1

| BIT | SER |
| --- | --- |
| Z2 | 0.99 |
| Z1 | 0.99 |
| Z0 | $<2 \times 10^{-4}$ |

These results clearly indicate that bits Z2 and Z1 are not well protected, but that bit Z0 is. It has also been found desirable to insert the bit from data stream 2 every X number of symbols, where X is an odd number and not a factor of 12 (as the delay in the convolutional encoder is 12). For the identified ATSC example, it is also preferable that X be equal to or greater than 5 as has been discussed. These precautions ensure that the inserted data from data stream 2 (signal 150') is spread over all 12 Trellis decoders and does not interfere with continued conventional reception and decoding of data stream 1 by receiver 20.

Therefore, according to a preferred form of the present invention, data stream 2 can be transmitted as a 2VSB signal in the Z0 position at a bit rate of 2.125 Mbps without degrading the performance of the ATSC DTV system. Data from stream 2 is substituted into the Z0 bit position of data stream 1 every fifth Z0 bit, while maintaining the SER for the data stream 1 below the TOV. The Trellis decoder 100, deinterleave 120 and R/S decoder 140 conventionally compensate for these errors in a conventional receiver 20.

It should of course be understood that as the quality of the transmission channel deteriorates, the bit rate of data stream 2 can be reduced to maintain the SER of data stream 1 below the TOV and hence not interfere with conventional ATSC DTV system operation. Data stream 2 (signal 150') can be used as a low bit-rate content provider such as in datacasting stock information for example in good transmission/reception situations, and used as a continuous training signal in poor reception conditions to improve overall reliability of the ATSC DTV system.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. It is intended that the patent shall cover by suitable expression in the appended claim, whatever features of patentable novelty exist in the invention disclosed.

I claim:

1. A method for generating a compressed domain, digital signal suitable for transmission, said method comprising:
   providing a first digital data stream signal including a first plurality of data bits and a second digital data stream signal including a second plurality of data bits;
   determining a threshold value for said first digital data stream signal;
   identifying select ones of said first plurality of bits dependent upon said threshold value; and,
   substituting data bits from said second plurality for said select bits of said first plurality to generate a composite digital data stream signal;
   wherein said composite digital data stream signal is adapted to be received and decoded by receivers adapted to receive said first digital data stream signal and receivers adapted to receive said composite digital data stream signal.

2. The method of claim 1, wherein said threshold value is indicative of a percentage of said first plurality of data bits.

3. The method of claim 2, wherein said first digital stream signal is an ATSC DTV data stream signal.

4. The method of claim 2, wherein said threshold value is a threshold of visibility value for said first digital data stream signal.

5. The method of claim 4, wherein said second digital data stream signal has a bit rate lower than a bit rate of said first digital data stream signal.

6. The method of claim 5, wherein said first digital data stream signal has a bit rate of approximately 19.28 Mbps.

7. The method of claim 6, wherein said bit rate of said second digital data stream signal is equal or less than approximately 2.152 Mbps.

8. The method of claim 1, further comprising the step of convolutionally encoding pairs of said first plurality of data bits to produce a plurality of Z0, Z1 and Z2 data bits, wherein said select ones of said first data bits are select ones of said Z0 bits.

9. The method of claim 8, wherein at most each fifth Z0 bit is a select bit.

10. The method of claim 8, further comprising:
    Reed Solomon encoding, interleaving and convolutionally encoding said first plurality of data bits; and,
    Reed Solomon encoding, interleaving and convolutionally encoding said second plurality of data bits.

11. A device for generating a compressed domain composite signal including data bits from a first digital data stream signal and a second digital data stream signal, and being suitable for transmission to and for reception by a first receiver being adapted to receive said first digital data stream signal and a second receiver being adapted to receive said composite digital signal, said device comprising:
    a first forward error correction device including an input adapted to receive said first digital data stream signal and an output, wherein said first digital data stream signal includes a first plurality of digital data bits;
    a second forward error correction device including an input adapted to receive said second digital data stream signal and an output, wherein said second digital data stream signal includes a second plurality of digital data bits; and,
    means for selectively replacing select ones of said first plurality of data bits with data bits from said second plurality to generate said composite signal;
    wherein, said means for selectively replacing said select data bits is coupled to said first and second forward error correction devices and said select ones of said first plurality of data bits are selected such that at least a given percentage of said first plurality of data bits are included in said composite signal.

12. The device of claim 11, wherein said first error correction device comprises:
    a first Reed Solomon encoder including said first input and an output;
    a first interleaver having an input coupled to said output of said first Reed Solomon encoder and an output; and,
    a first convolutional encoder having an input coupled to said output of said first interleaver and said first error correction device output.

13. The device of claim 12, wherein said second error correction device comprises:
    a second Reed Solomon encoder including said second input and an output;

a second interleaver having an input coupled to said output of said second Reed Solomon encoder and an output; and, a second convolutional encoder having an input coupled to said output of said second interleaver and said second error correction device output.

14. The device of claim 13, wherein said means for replacing is coupled to said outputs of said first and second convolutional coders.

15. The device of claim 14, further comprising a controller for identifying said select bits of said first data stream signal and being coupled to said means for replacing.

16. The device of claim 15, wherein said means for replacing comprises an output and a switch for selectively applying bits from said first and second data streams to said means for replacing output.

17. The method of claim 16, wherein said first digital stream is an ATSC DTV data stream.

18. The device of claim 11, wherein said given percentage corresponds to a threshold of visibility value for said first digital data stream signal.

19. The device of claim 12, wherein said first convolutional encoder is adapted to encode pairs of said first plurality of data bits to produce a plurality of Z0, Z1 and Z2 data bits, and said select ones of said first data bits are select ones of said Z0 bits.

20. A receiver suitable for receiving compressed domain digital signals, said receiver comprising:

a first error correction device for correcting errors in a first signal;

a second error correction device for correcting errors in a second signal; and, means for receiving a composite signal including data bits from said first signal and data bits from said second signal and applying said bits from said first and second signals to said first error correction device and said data bits from said second signal to said second error correction device;

wherein said first signal is adapted to be received by a first type of receiver.

21. The receiver of claim 20, wherein said first signal is an ATSC DTV signal.

22. The receiver of claim 21, wherein said composite signal includes a plurality of a first type of data bits, a plurality of a second type of data bits and a plurality of a third type of data bits, wherein said data bits from said second signal are select ones of a said first type of data bits.

23. The receiver of claim 22, wherein at most each fifth first type of data bit is a select data bit.

24. The receiver of claim 20, wherein said first error correction device comprises a first Trellis decoder, first deinterleaver and a first Reed Solomon decoder.

25. The receiver of claim 24, wherein said second error correction device comprises a second Trellis decoder, second deinterleaver and a second Reed Solomon decoder.

26. A method for receiving a composite, compressed domain, digital signal comprising:

receiving a composite signal including data bits corresponding to a first signal and data bits corresponding to a second data signal, wherein said composite signal is adapted to be received by a receiver adapted to receive said first signal; and, applying said data bits corresponding to said first data signal and data bits corresponding to said second data signal to a first circuit and said data bits corresponding to said second signal to a second circuit;

wherein said first signal is an ATSC DTV signal; and wherein said composite signal includes a plurality of first type data bits, a plurality of second type data bits and a plurality of third type data bits; and said data bits corresponding to said second signal are select ones of said first type of data bits.

27. The method of claim 26, further comprising:

Trellis decoding, de-interleaving and Reed Solomon decoding said data bits applied to said first circuit; and, Trellis decoding, de-interleaving and Reed Solomon decoding said data bits applied to said second circuit.

28. A method for operating a compressed domain digital signal transmission and reception system comprising:

providing a first signal including a first plurality of data bits and second signal including a second plurality of data bits;

determining a threshold value for said first signal, said threshold value being indicative of a percentage of said first plurality of data bits;

identifying select ones of said first plurality of bits dependent upon said threshold value;

substituting data bits from said second plurality for said select bits of said first plurality to generate a composite signal; and, applying said data bits corresponding to said first signal and said data bits corresponding to said second signal to a first decoding circuit and said data bits corresponding to said second signal to a second decoding circuit;

wherein said composite digital data stream signal is adapted to be effectively received and decoded by receivers to receive said first digital data stream signal and receivers adapted to receive said composite digital data stream signal.

29. The method of claim 28, wherein said first signal includes a plurality of a first type of data bits, a plurality of a second type of data bits and a plurality of a third type of data bits, and select ones of said first type of data bits correspond to said second signal.

* * * * *